United States Patent Office 2,904,601
Patented Sept. 15, 1959

2,904,601
1,2-DIBROMO-3-CHLORO-1,1,3,3-TETRA-FLUOROPROPANE

Edgar M. Ilgenfritz, Midland, Mich., assignor to The Dow Chemical Company, Midland, Mich., a corporation of Delaware No Drawing. Application January 18, 1957
Serial No. 634,812

2 Claims. (Cl. 260—653)

This invention relates to a new halo organic compound and is more particularly concerned with 1,2-dibromo-3-chloro-1,1,3,3-tetrafluoropropane and with a method for its preparation.

The compound of the present invention inhibits the growth of and kills specific organisms of bacteria and fungus, as well as specific insects in fumigation tests. It has utility as a fumigant, being active at relatively low concentrations.

Preparation of the compound of the present invention is readily accomplished by bromination of $$CF_2=CH-CF_2Cl$$

which in turn was prepared by dechlorination of $$CF_2Cl-CHCl-CF_2Cl$$

with zinc in absolute ethanol. A method for preparing the compound of the present invention and an intermediate in its preparation is shown in the following examples which are given for the purpose of illustration only and are not to be construed as limiting the invention thereto.

Example 1

*Dechlorination of 1,2,3-trichloro 1,1,3,3-tetrafluoropropane.*—The known compound, $$CF_2Cl-CHCl-CF_2Cl$$

was prepared by treatment of $CCl_3-CHCl-CCl_3$ with $SbF_3$ and 10% $SbCl_5$. Dechlorination of $$CF_2Cl-CHCl-CF_2Cl$$

was carried out in a three necked flask equipped with a dropping funnel and a water cooled reflux condenser, connected to a Dry Ice-acetone cooled trap. The flask was charged with a 10% molar excess of mossy zinc and the zinc covered with absolute ethanol. A 50/50 volume mixture of absolute ethanol and 440 parts of $$CF_2Cl-CHCl-CF_2Cl$$

were added slowly to the flask over a half hour period. When the exothermic reaction subsided, the flask was further refluxed for four hours. The product was collected in the Dry-Ice cooled trap and redistilled to yield a conversion of 53% of $CF_2Cl-CH=CF_2$, boiling at 14.5 degrees centigrade at atmospheric pressure.

Example 2

*Bromination of 3-chloro-1,1,3,3-tetrafluoropropene-1.*—Preparation of $CF_2Br-CHBr-CF_2Cl$ was accomplished by bubbling $CF_2=CH-CF_2Cl$ through a fritted glass bubbler mounted in a flask containing a slight theoretical excess of bromine, and, irradiating the reaction mixture with actinic light. The starting material was recycled until it was completely absorbed in the bromine. When complete absorption had been accomplished, the crude product was washed free of excess bromine using a dilute $Na_2CO_3$ solution, dried over $CaSO_4$ and distilled to give a 91% conversion to $CF_2Br-CHBr-CF_2Cl$, boiling at 120.5 to 123.5 degrees centigrade at atmospheric pressure.

1,2 - dibromo - 3 - chloro - 1,1,3,3-tetrafluoropropane, $$CF_2Br-CHBr-CF_2Cl$$

is a clear colorless liquid having a specific gravity ($d_4^{25}$) of 2.185, a refractive index ($n_D^{25}$) of 1.4219, a molecular refraction of 35.9, and the sum of atomic refractions is 36.3.

When vapors of the compound of the present invention are contacted with common bacteria- and mold-forming organisms in standard fumigation tests, an inhibition of growth or complete kill of the organisms resulted, even when quantities as small as 1 pound of compound per 1000 cubic feet of space fumigated were employed. In other fumigation tests, at concentrations as low as ½ pound of the compound of the present invention per 1000 cubic feet of space, 100 percent kills of both confused flour beetles and black carpet beetles were obtained in 16 hour exposure tests.

I claim:
1. 1,2-dibromo-3-chloro-1,1,3,3-tetrafluoropropane.
2. The process which comprises: contacting bromine and 3-chloro-1,1,3,3-tetrafluoropropene-1 in the presence of actinic light, and, separating 1,2-dibromo-3-chloro-1,1,3,3-tetrafluoropropane from the reaction mixture.

References Cited in the file of this patent
UNITED STATES PATENTS 2,676,193    Ruh ------------------ Apr. 20, 1954

OTHER REFERENCES

Henne et al.: Jour. Am. Chem. Soc., vol. 61, pp. 2489 to 2491, September 1939.
Simons: Fluorine Chemistry, vol. I (1950), Academic Press Inc., New York, N.Y., pp. 501 and 539.
Hauptschein et al.: Jour. Am. Chem. Soc., vol. 73, pp. 5591 to 5593, December 1951.
Simons: Fluorine Chemistry, vol. II (1954), Academic Press, Inc., New York, N.Y., p. 275.